(12) United States Patent
Chang et al.

(10) Patent No.: US 10,581,503 B2
(45) Date of Patent: Mar. 3, 2020

(54) METHOD, APPARATUS AND SYSTEM FOR REPORTING BEAM REFERENCE SIGNAL RECEIVING POWER

(71) Applicant: Intel IP Corporation, Santa Clara, CA (US)

(72) Inventors: Wenting Chang, Beijing (CN); Yuan Zhu, Beijing (CN); Huaning Niu, Milpitas, CA (US); Gang Xiong, Portland, OR (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/752,553

(22) PCT Filed: Apr. 1, 2016

(86) PCT No.: PCT/CN2016/078388
§ 371 (c)(1),
(2) Date: Feb. 13, 2018

(87) PCT Pub. No.: WO2017/067138
PCT Pub. Date: Apr. 27, 2017

(65) Prior Publication Data
US 2019/0028167 A1 Jan. 24, 2019

Related U.S. Application Data

(60) Provisional application No. 62/244,609, filed on Oct. 21, 2015.

(51) Int. Cl.
*H04B 7/06* (2006.01)
*H04B 7/0413* (2017.01)

(52) U.S. Cl.
CPC ......... *H04B 7/0617* (2013.01); *H04B 7/0413* (2013.01); *H04B 7/063* (2013.01)

(58) Field of Classification Search
CPC ..... H04B 7/0413; H04B 7/063; H04B 7/0617
See application file for complete search history.

(56) References Cited

U.S. PATENT DOCUMENTS

| | | | | |
|---|---|---|---|---|
| 2013/0195275 A1* | 8/2013 | Koivisto | ............... | H04L 1/0061 380/287 |
| 2014/0148198 A1* | 5/2014 | Siomina | ............... | H04W 64/00 455/456.1 |

(Continued)

FOREIGN PATENT DOCUMENTS

| | | |
|---|---|---|
| CN | 104184561 A | 12/2014 |
| CN | 104205911 A | 12/2014 |

(Continued)

OTHER PUBLICATIONS

International Search Report and Written Opinion dated Jul. 15, 2016 from International Application No. PCT/CN2016/078388, 11 pages.

*Primary Examiner* — Kabir A Timory
(74) *Attorney, Agent, or Firm* — Fish & Richardson P.C.

(57) ABSTRACT

Machine-readable media, methods, apparatus and system for beam acquisition in a wireless system are disclosed. In some embodiments, a base station may comprise a transceiver to transmit, to a user equipment (UE), a plurality of beam reference signals (BRSs) via a plurality of transmission beams; and to receive, from the UE, a report to report receiving information associated with at least one of the BRSs on at least one of the transmission beams, wherein the report comprises an antenna identifier to identify a directional antenna panel or an antenna port associated with the directional antenna panel of the UE which receives the at least one of the BRSs on the at least one of the transmission beam.

30 Claims, 4 Drawing Sheets

(56) References Cited

U.S. PATENT DOCUMENTS

| | | | | |
|---|---|---|---|---|
| 2014/0211731 A1* | 7/2014 | Inoue | .................. | H04B 7/0456 |
| | | | | 370/329 |
| 2015/0230263 A1* | 8/2015 | Roy | ..................... | H04W 16/28 |
| | | | | 455/452.2 |
| 2015/0271694 A1* | 9/2015 | Jung | ..................... | H04W 24/10 |
| | | | | 370/328 |

FOREIGN PATENT DOCUMENTS

| | | |
|---|---|---|
| CN | 104734805 A | 6/2015 |
| WO | 2015020404 A1 | 2/2015 |

\* cited by examiner

| Panel index | TX beam index | BRS-RP value |
|---|---|---|
| Panel #0 or Rx antenna ports {A, B} | #0 | $x_{0,0}$ dBm |
| | #1 | $x_{0,1}$ dBm |
| | ⋮ | ⋮ |
| | # $N_{Tx-1}$ | $x_{0,N_{Tx}-1}$ dBm |
| Panel #1 or Rx antenna ports {C, D} | #0 | $x_{1,0}$ dBm |
| | #1 | $x_{1,1}$ dBm |
| | ⋮ | ⋮ |
| | # $N_{Tx}-1$ | $x_{1,N_{Tx}-1}$ dBm |

METHOD, APPARATUS AND SYSTEM FOR REPORTING BEAM REFERENCE SIGNAL RECEIVING POWER

CROSS REFERENCE TO RELATED APPLICATIONS

The present application is a national phase entry under 35 U.S.C. § 371 of International Application No. PCT/CN2016/078388, filed Apr. 1, 2016, entitled "METHOD, APPARATUS AND SYSTEM FOR REPORTING BEAM REFERENCE SIGNAL RECEIVING POWER," which designates the United States of America, which claims the benefit of priority under 35 U.S.C. § 119(e) of U.S. Provisional Application No. 62/244,609, filed Oct. 21, 2015, the entire specifications of which are hereby incorporated by reference in their entireties for all purposes.

FIELD

Embodiments of the present invention relate generally to the field of beam reference signal (BRS) receiving power (BRS-RP) report, and more particularly, to the BRS-RP report in a $5^{th}$ generation wireless system.

BACKGROUND INFORMATION

In a wireless network, e.g., a wireless network operating in accordance with a $5^{th}$ generation system, an evolved Node B (eNB) may have a large number of transmission beams to support massive multiple-input, multiple-output (MIMO). Beam reference signals (BRSs) mapped on the transmission beams may be transmitted to a user equipment (UE) connected with the eNB via the wireless network.

BRIEF DESCRIPTION OF THE DRAWINGS

Embodiments of the invention are illustrated by way of example, and not by way of limitation, in the figures of the accompanying drawings in which like reference numerals refer to similar elements.

DESCRIPTION OF THE EMBODIMENTS

Illustrative embodiments of the present disclosure include, but are not limited to, methods, systems, and apparatuses for beam reference signal receiving power (BRS-RP) report in a wireless system, for example, in a $5^{th}$ generation wireless system.

Various embodiments of the illustrative embodiments will be described using terms commonly employed by those skilled in the art to convey the substance of their work to others skilled in the art. However, it will be apparent to those skilled in the art that some alternate embodiments may be practiced using with portions of the described embodiments. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order to not obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figures 1, 2:
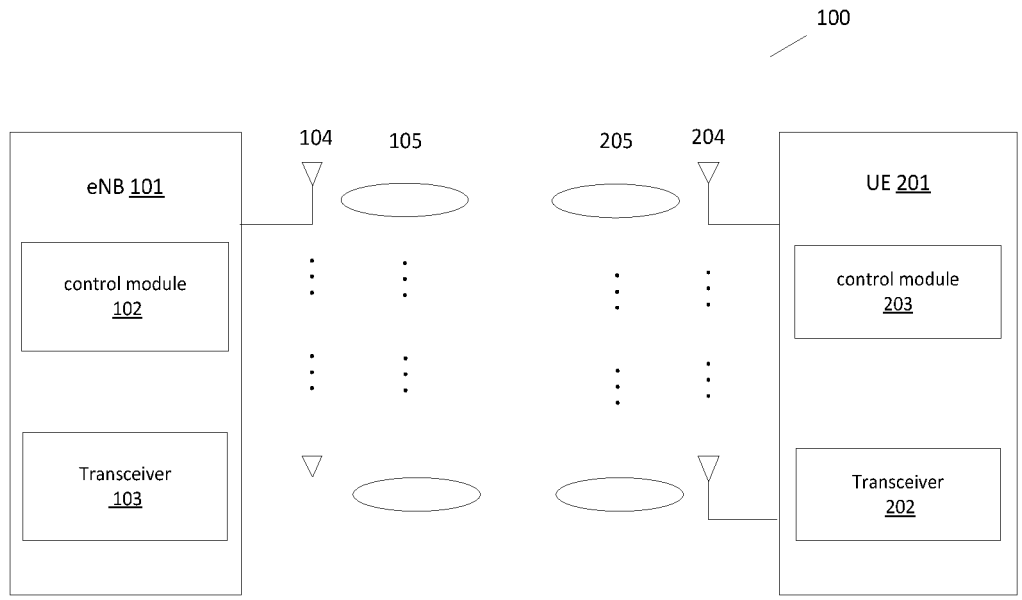
FIG. 1 schematically illustrates a wireless system comprising an evolved Node B (eNB) and a user equipment (UE) for beam reference signal receiving power (BRS-RP) report and others, in accordance with various embodiments.
FIG. 2 schematically illustrates an example of BRS-RP measurement by the UE having directional antenna panel(s), in accordance with various embodiments.

FIG. 1 schematically illustrates a wireless system 100 comprising an evolved Node B (eNB) 101 and a user equipment (UE) 201 for BRS-RP report and others, in accordance with various embodiments. In some embodiments, eNB 101 may comprise a control module 102, a transceiver 103, a plurality of antennas 104, and others. Control module 102 may generate a plurality of beam reference signals (BRSs) which may be used to measure channel state and quality for each of transmission beams 105 generated by antennas 104. Control module 102 may further map the BRSs onto transmission beams 105 before transceiver 103 transmit the BRSs via the transmission beams to UE 201. In some embodiments, transceiver 103 may further receive, from UE 201, a BRS-RP report to report power of receiving at least one of the BRSs on at least one of the transmission beams by at least one directional antenna panel of UE 201.

In some embodiments, besides the receiving power, the BRS-RP report may comprise a BRS identifier to identify the BRS associated with the receiving power, a transmission beam identifier to identify the transmission beam that the BRS may be mapped on, a receiving antenna panel identifier to identify a directional antenna panel of UE 201 that may receive the BRS on the transmission beam, and/or others. In a case that UE 201 comprises more than one directional antenna panels, the receiving power in the BRS-RP report may be the highest receiving power for each of the at least one of the BRSs on each of the at least one of the transmission beams across the directional antenna panels. In some embodiments, the receiving power in the BRS-RP report may be higher than a threshold. In some embodiments, the number for the reported transmission beams associated with the BRS-RP may be pre-determined. In some embodiments, the number of the reported receiving antenna panel associated with the BRS-RP may be predetermined. In some embodiments, the receiving antenna panel identifier may comprise 1 bit flag to identify whether the receiving antenna panel is a default panel or not. In some embodiments, the directional antenna panel of UE 201 may comprise an antenna array of multiple antenna elements, which may point to a spatial direction based on at least one polarization direction through beamforming. In view of this, the receiving antenna panel identifier may be alternatively used to identify the antenna port(s) that receive the BRS on the transmission beams.

With the above-stated scheme of BRS-RP reporting, the overhead for UE 201 to transmit the BRS-RP report may be reduced. More details for the BRS-RP report may be described in the below with reference to FIGS. 2-4.

In some embodiment, control module 102 of eNB 101 may select transmission beam candidates from the BRS-RP report. For example, control module 102 may select N transmission beam candidates having highest receiving power from the BRS-RP report. Control module 102 may then use the transmission beam candidates to configure channel control information, such as a channel state information-reference signal (CSI-RS), an enhanced physical download control channel (EPDCCH), and/or others. For example, control module 102 may include the receiving antenna panel identifier associated with the transmission beam candidates in the CSI-RS configuration information, the EPDCCH configuration information, and/or others.

For another example, control module 102 may determine whether one or more transmission antenna panels (or transmission antenna ports) should be used for the transmissions between eNB 101 and UE 201, at least in part based on whether the receiving antenna panel identifier associated with the transmission beam candidates identifies one or more receiving antenna panels. More specifically, if the receiving antennal panel identifier identifiers that the transmission beam candidates are associated with one receiving antenna panel, control module 102 may determine to use single transmission antenna panel (or related transmission antenna ports) for the transmission between eNB 101 and UE 201. If the receiving antennal panel identifier identifiers that the transmission beam candidates are associated with more than one receiving antenna panel, for example, to a default antenna panel as well as an alternative antenna panel, control module 102 may determine to use dual or more transmission antenna panels (or related transmission antenna ports) for the transmission between eNB 101 and UE 201.

This way may help eNB 101 to more efficiently navigate transmission resource to serve the UE(s). In some embodiments, eNB 101 may select a transmission beam with a highest BRS-RP value for further communication between eNB 101 and UE 201.

In some embodiments, UE 201 may comprise a transceiver 202, a control module 203, a plurality of antennas 204, and/or others. Transceiver 202 may receive the plurality of BRSs mapped on the plurality of transmission beams 105 via receiving beams 205 generated by antennas 204. In some embodiments, the receiving beam may comprise an optimized receiving beam of each receiving antenna panel which may be obtained from a previous beam acquisition process. The receiving antenna panel may comprise the directional antenna panel having an antenna array of multiple antenna elements, which may point to a spatial direction based on at least one polarization direction through beamforming.

Control module 203 may calculate the power of receiving each BRS mapped on each transmission beam 105 by each of the receiving antenna panel(s). In some embodiments, UE 201 may comprise one or more receiving antenna panels, for example, a default antenna panel and an alternative antenna panel. Control module 203 may then generate the BRS-RP report comprising the receiving power, a BRS identifier to identify the BRS associated with the receiving power, a transmission beam identifier to identify the transmission beam that the BRS may be mapped on, a receiving antenna panel identifier to identify the directional antenna panel or a receiving antenna port identifier to identify a receiving antenna port associated with the directional antenna panel that may receive the BRS on the transmission beam, and/or others. In some embodiments, if UE 201 comprises more than one directional antenna panels, the receiving power in the BRS-RP report may be the highest receiving power for each of the at least one of the BRSs on each of the at least one of the transmission beams across the directional antenna panels. In some embodiments, the receiving power in the BRS-RP report may be higher than a threshold. In some embodiments, the number for the reported transmission beams associated with the BRS-RP may be pre-determined. In some embodiments, the number of the reported receiving antenna panel associated with the BRS-RP may be predetermined. In some embodiments, the receiving antenna panel identifier (or the receiving antenna port identifier) may comprise 1 bit flag to identify whether the receiving antenna panel (or the receiving antenna port) is a default panel (or a default antenna port) or not.

With the above-stated scheme of BRS-RP reporting, the overhead for UE 201 to transmit the BRS-RP report may be reduced. More details for the BRS-RP report may be described in the below with reference to FIGS. 2-4.

It should be understood that other embodiments may implement other technologies for the wireless system 100 of FIG. 1. In some embodiments, besides the $5^{th}$ generation wireless technology, the wireless system 100 may use a variety of other wireless access technologies such as Code Division Multiple Access (CDMA). Frequency Division Multiple Access (FDMA), Time Division Multiple Access (TDMA). Orthogonal Frequency Division Multiple Access (OFDMA), Single Carrier Frequency Division Multiple Access (SC-FDMA), and/or others in compliance with an Institute of Electrical and Electronics Engineers (IEEE) 802 system, a 3rd Generation Project Partnership (3GPP) system, a 3GPP Long Term Evolution (LTE) system, and/or a 3GPP2 system.

In some embodiments, the BRS-RP report may be replaced by a BRS receiving quality (BRS-RQ) report which may report BRS receiving quality, or other reports which may report BRS receiving information and help eNB 101 to configure transmission channels between eNB 101 and UE 201.

FIG. 2 schematically illustrates an example of BRS-RP measurement by the UE having directional antenna panel(s), in accordance with various embodiments. As illustrated in FIG. 2, the BRS-RP measurement result by the directional antenna panel(s) of UE 201 may include BRS-RP measurement values as well as indications of the directional antenna panel(s), transmission beams and/or others that may be associated with the BRS-RP measurement. For example, the receiving power of the BRS mapped on the transmission beam #$N_{Tx-1}$ may be measured as $x_{0;N_{Tx-1}}$ dBm by the directional antenna panel #0 of UE 201, wherein $N_{Tx-1}$ may represent the number of transmission beams 105 carrying the BRSs whose receiving power may be measured.

It should be understood that other embodiments may implement other technologies for BRS receiving information measurement by UE 201. For example, the BRS-RP report may be replaced by a BRS receiving quality (BRS-RQ) report which may report BRS receiving quality, or other reports which may report BRS receiving information and help eNB 101 to configure transmission channels between eNB 101 and UE 201. For another example, UE 201 may comprise one directional antenna panel and the panel index as shown in FIG. 2 may be omitted. For yet another embodiment, the panel index may be replaced by receiving antenna port index, such as ports (A, B) to replace panel #0, ports (C, D) to replace panel #1, and so on.

Figure 3:
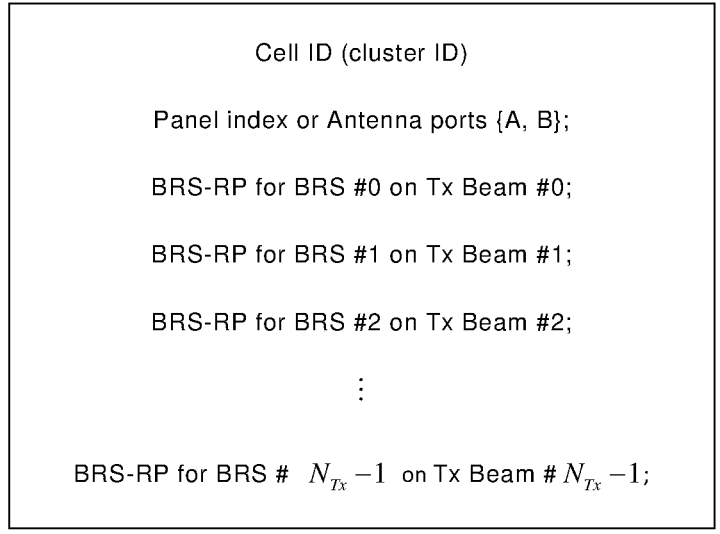
FIG. 3 schematically illustrates an example of a BRS-RP report for a directional antenna panel of the UE, in accordance with various embodiments.

FIG. 3 schematically illustrates an example of a BRS-RP report for a directional antenna panel of UE 201, in accordance with various embodiments. As illustrated in FIG. 3, besides the measured BRS-RP, the BRS-RP report may comprise an antenna panel identifier, a BRS identifier and a transmission beam identify to identify the receiving antenna panel, the BRS and the transmission beam associated with the measured BRS-RP. In some embodiments, the BRS-RP report may further comprise a cell identifier to identify a serving cell from which the identified transmission beam may be served.

In some embodiments, the BRS-RP report as illustrated in FIG. 3 may comprise a predetermined highest BRS-RP values, rather than all measured BRS-RP values in order to save the BRS-RP report overhead. In some embodiments, the BRS-RP report may comprise the BRS-RP values which are higher than a threshold. For example, if UE 201 comprises two or more receiving antenna panels, the BRS-RP report for a secondary or other subsequent antenna panel may comprise a BRS-RP value meeting the following condition:

$$\gamma' - \gamma_j < \Delta$$

wherein, $\gamma'$ may represent the maximum BRS-RP value measured by the previous receiving antenna panel, such as the antenna panel #0, $\gamma_j$ may represent a BRS-RP value measured by a subsequent receiving antenna panel, such as the antenna panel #1, $\Delta$ may represent a difference threshold.

In some embodiments, eNB 101 may request UE 201 to report the BRS-RP values measured by a specific receiving antenna panel. ENB 101 may know the number of directional antennal panel(s) that UE 201 may have and their capacities through the UE capability reporting, when UE 201 accesses the wireless system 100. The specific receiving antenna panel may be obtained through a previous BRS-RP report process.

It should be understood that other embodiments may implement other technologies for BRS-RP report of FIG. 3. For example, the BRS-RP report may be replaced by a BRS receiving quality (BRS-RQ) report which may report BRS receiving quality, or other reports which may report BRS receiving information and help eNB 101 to configure transmission channels between eNB 101 and UE 201. For another example, UE 201 may comprise one directional antenna panel and the panel index as shown in FIG. 3 may be omitted. For yet another embodiment, the panel index may be replaced by receiving antenna port index, such as ports (A, B) to replace panel #0, ports (C, D) to replace panel #1, and so on.

Figure 4:
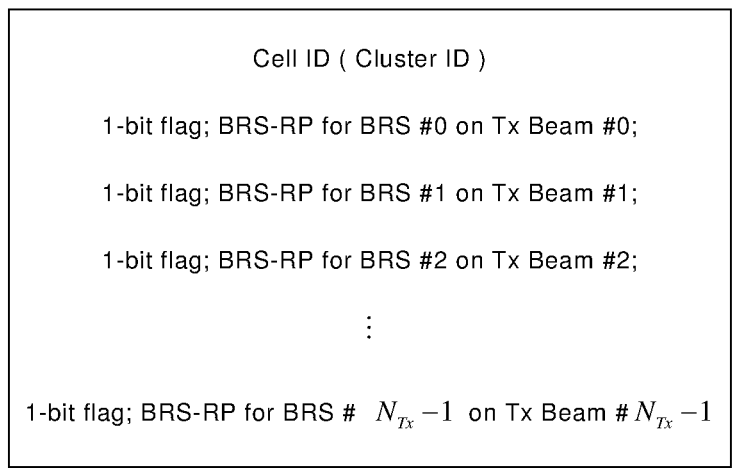
FIG. 4 schematically illustrates an example of a BRS-RP report for all directional antenna panel(s) of the UE, in accordance with various embodiments.

FIG. 4 schematically illustrates an example of a BRS-RP report for all directional antenna panel(s) of the UE, in accordance with various embodiments. As illustrated by FIG. 4, the BRS-RP report may comprise a highest BRS-RP value measure by all receiving antenna panel(s) of UE 201 for a BRS on a transmission beam. For example, if UE 201 comprises two or more directional antenna panels, the BRS-RP value in the BRS-RP report as illustrated in FIG. 4 may represent the highest BRS-RP value measured across all of the directional antenna panels for a specific transmission beam. In this way, UE 201 may not need to report the BRS-RP values measured by each of the directional antenna panels.

The BRS-RP report may further comprise an antenna identifier to identify the directional antenna panel which measures the highest BRS-RP. In some embodiments, the antenna identifier may comprise 1 bit flag to identify whether the directional antenna panel is a default panel or not. In a case that the BRS-RP report may report antenna port(s) rather than the antenna panel(s), the antenna identifier may identify whether the antenna port(s) which may receive the BRS on the transmission beam with the highest receiving power is a default antenna port(s) or not.

It should be understood that other embodiments may implement other technologies for BRS-RP report of FIG. 4. For example, the BRS-RP report may be replaced by a BRS receiving quality (BRS-RQ) report which may report BRS receiving quality, or other reports which may report BRS receiving information and help eNB 101 to configure transmission channels between eNB 101 and UE 201.

Figure 5:
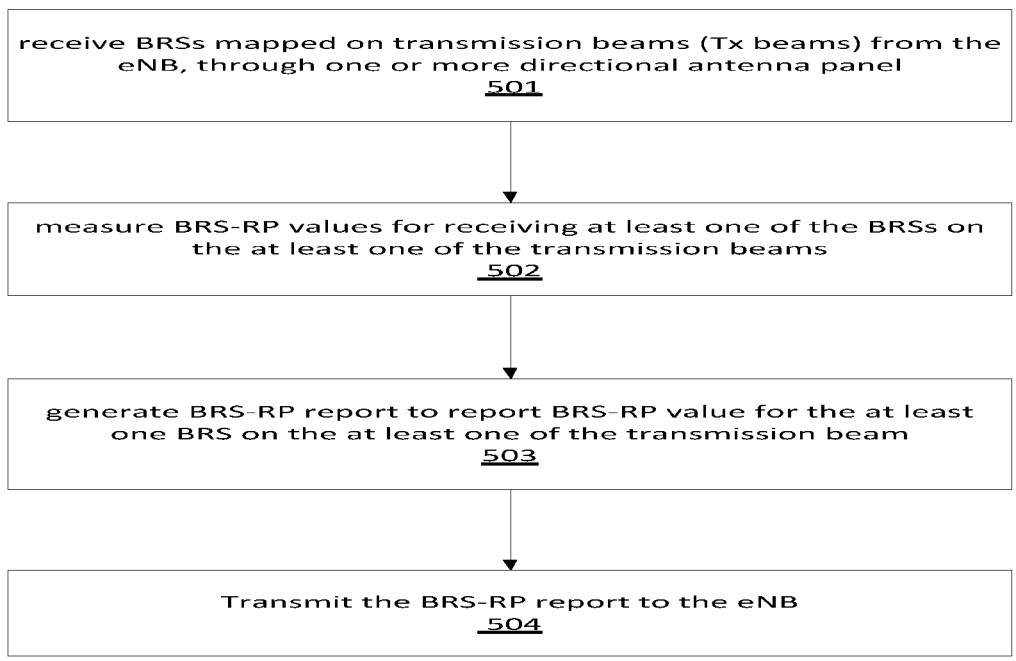
FIG. 5 schematically illustrates a method of reporting the BRS-RP from the UE to the eNB, in accordance with various embodiments.

FIG. 5 schematically illustrates a method of reporting the BRS-RP from the UE to the eNB, in accordance with various embodiments. As illustrated in FIG. 5, in some embodiments, transceiver 202 or other devices of UE 201 may receive BRSs mapped on transmission beams 105 from eNB 101, through one or more directional antenna panels of UE 201 in block 501. In some embodiments, the optimized receiving beam from each directional antenna panel which may be obtained via a previous beam acquisition process may receive the BRSs. The directional antenna panel may comprise an antenna array having multiple antenna elements, which may point to a spatial direction based on at least one polarization direction through beamforming.

In block 502, control module 203 or other devices of UE 201 may measure BRS-RP values for receiving the at least one BRS on the at least one transmission beam. Examples of the BRS-RP measurement may be illustrated in FIG. 2, which may comprise BRS-RP values and identifiers of the directional antenna panel(s), BRSs, transmission beams and others that may be associated with the BRS-RP values.

In block 503, control module 203 or other devices of UE 201 may generate the BRS-RP report to report the BRS-RP value(s) for the at least one BRS on the at least one transmission beam. Examples of the BRS-RP report may be illustrated in FIGS. 3 and 4, which may include BRS-RP values for each directional antenna panel or for all directional antenna panel(s) through, for example, reporting the highest BRS-RP values for the at least one BRS on the at least one transmission beam across all of the directional antenna panel(s). For other example, the BRS-RP report may comprise the BRS-RP values which are higher than a threshold. For other example, the number for the reported transmission beams associated with the BRS-RP may be pre-determined. For other example, the number of the reported receiving antenna panel associated with the BRS-RP may be predetermined. For other example, the receiving antenna panel identifier (or the receiving antenna port identifier) may comprise 1 bit flag to identify whether the directional antenna panel is a default panel or not. In block 504, transceiver 202 or other devices of UE 201 may transmit the BRS-RP report to the eNB.

It should be understood that other embodiments may implement other technologies for BRS receiving information measurement by UE 201. For example, the BRS-RP report may be replaced by a BRS receiving quality (BRS-RQ) report which may report BRS receiving quality, or other reports which may report BRS receiving information and help eNB 101 to configure transmission channels between eNB 101 and UE 201. For another example, UE 201 may comprise one directional antenna panel and the panel index as shown in FIG. 2 may be omitted. For yet another embodiment, the panel index may be replaced by receiving antenna port index, such as ports (A, B) to replace panel #0, ports (C, D) to replace panel #1, and so on.

Figure 6:
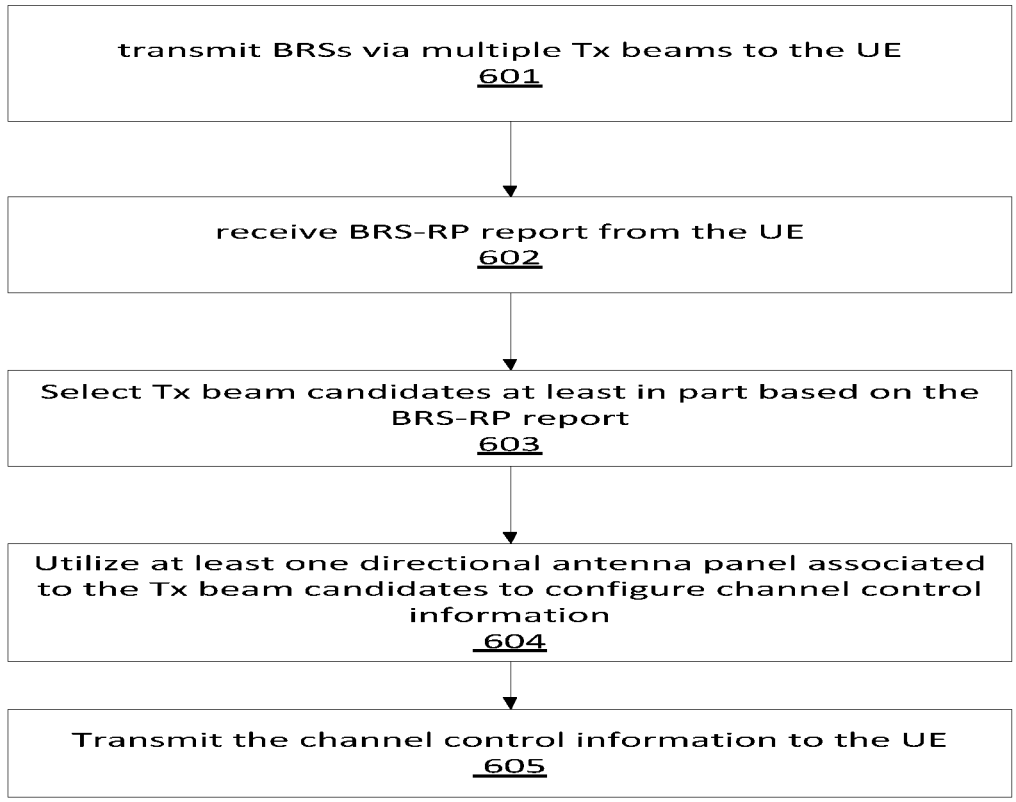
FIG. 6 schematically illustrates a method of utilizing the BRS-RP for channel control from the eNB to the UE, in accordance with various embodiments.

FIG. 6 schematically illustrates a method of utilizing the BRS-RP for channel control from the eNB to the UE, in accordance with various embodiments. As illustrated in FIG. 6, in some embodiments, transceiver 103 or other devices of eNB 101 may transmit the BRSs via transmission beams 105 to UE 201, in block 601. In block 602, transceiver 103 or other devices of eNB 101 may receive the BRS-RP report from UE 201, wherein the BRS-RP report may report the receiving power associated with the as least one BRS on the at least one transmission beam which may be measured by the directional antenna panel(s) of UE 201.

Examples of the BRS-RP report may be illustrated in FIGS. 3 and 4, which may include BRS-RP values for each directional antenna panel or for all directional antenna panel(s) through, for example, reporting the highest BRS-RP values for the at least one BRS on the at least one transmission beam across all of the directional antenna panel(s). For other example, the BRS-RP report may comprise the BRS-RP values which are higher than a threshold. For other example, the number for the reported transmission beams associated with the BRS-RP may be pre-determined. For other example, the number of the reported receiving antenna panel associated with the BRS-RP may be predetermined. For other example, the antenna identifier associated with the BRS-RP may comprise 1 bit flag to identify whether the directional antenna panel of UE 201 is a default panel or not.

In block 603, control module 102 or other devices of eNB 101 may select the select transmission beam candidates at least in part based on the BRS-RP report. For example, control module 102 or other devices of eNB 101 may select N transmission beam candidates having highest receiving power from the BRS-RP report. In block 603, control module 102 may then utilize the selected transmission beams and/or other information associated with the selected transmission beams to configure channel control information, such as a channel state information-reference signal (CSI-RS), an enhanced physical download control channel (EPDCCH), and/or others. For example, control module 102 may select include the receiving antenna panel identifier associated with the transmission beam candidates in the CSI-RS configuration information, the EPDCCH configuration information, and/or others. For other example, control module 102 may determine whether one or more transmission antenna panels should be used for the transmissions between eNB 101 and UE 201, at least in part based on whether the receiving antenna panel identifier associated with the transmission beam candidates identifies one or more receiving antenna panels. More specifically, if the receiving antennal panel identifier identifiers that the transmission beam candidates are associated with one receiving antenna panel, control module 102 or other devices of eNB 101 may determine to use single transmission antenna panel (or related transmission antenna ports) for the transmission between eNB 101 and UE 201. If the receiving antennal panel identifier identifiers that the transmission beam candidates are associated with more than one receiving antenna panel, for example, to a default antenna panel as well as an alternative antenna panel, control module 102 or other devices of eNB 101 may determine to use dual or more transmission antenna panels for the transmission between eNB 101 and UE 201. This way may help eNB 101 to more efficiently navigate transmission resource to serve the UE(s).

It should be understood that other embodiments may implement other technologies for BRS receiving information measurement by UE 201. For example, the BRS-RP report may be replaced by a BRS receiving quality (BRS-RQ) report which may report BRS receiving quality, or other reports which may report BRS receiving information and help eNB 101 to configure transmission channels between eNB 101 and UE 201. For another example, UE 201 may comprise one directional antenna panel and the panel index as shown in FIG. 2 may be omitted. For yet another embodiment, the panel index may be replaced by receiving antenna port index, such as ports (A, B) to replace panel #0, ports (C, D) to replace panel #1, and so on.

Figure 7:
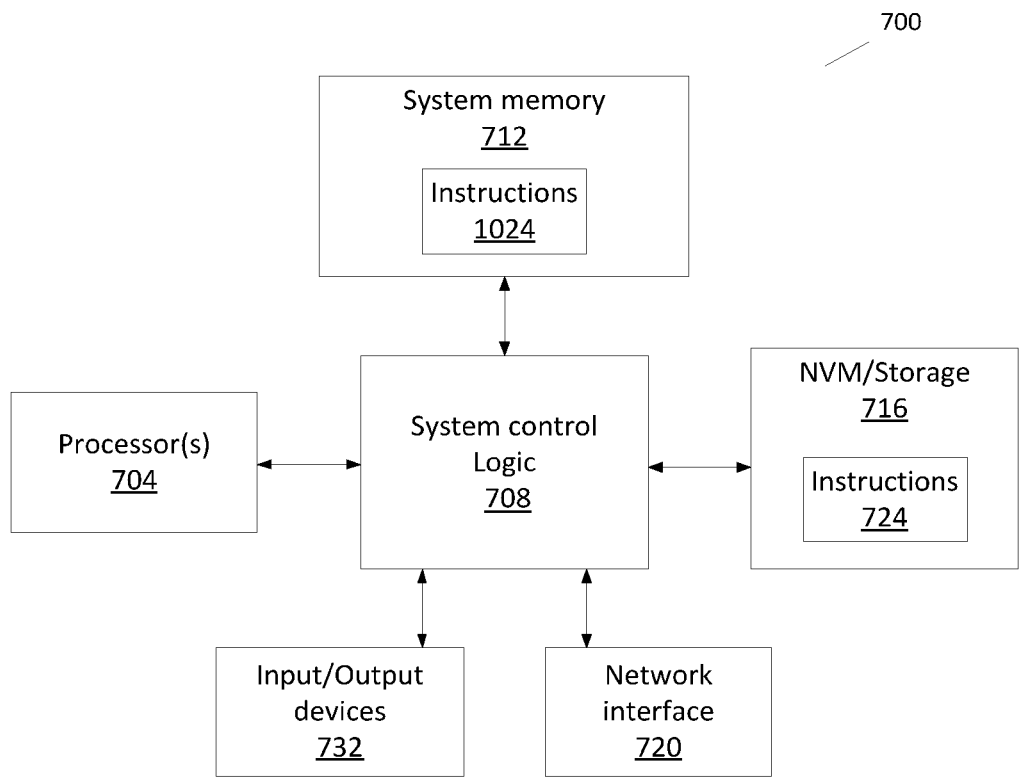
FIG. 7 schematically illustrates an example system in accordance with various embodiments.

FIG. 7 schematically illustrates an example system in accordance with various embodiments. In some embodiments, the system 700 may comprise one or more processor(s) 704, system control logic 708 coupled with at least one of the processor(s) 704, system memory 712 coupled with system control logic 708, non-volatile memory (NVM)/storage 716 coupled with system control logic 708, and a network interface 720 coupled with system control logic 708.

Processor(s) 704 may include one or more single-core or multi-core processors. Processor(s) 704 may include any combination of general-purpose processors and dedicated processors (e.g., graphics processors, application processors, baseband processors, etc.). In an embodiment in which the system 700 implements eNB 101, processors(s) 704 may be configured to execute one or more embodiment(s) as illustrated in FIGS. 1-4 and 6 in accordance with various embodiments. In an embodiment in which the system 700 implements UE 201, processors(s) 704 may be configured to execute one or more embodiment(s) as illustrated in FIGS. 1-5 in accordance with various embodiments.

System control logic 708 for one embodiment may include any suitable interface controllers to provide for any suitable interface to at least one of the processor(s) 704 and/or to any suitable device or component in communication with system control logic 708.

System control logic 708 for one embodiment may include one or more memory controller(s) to provide an interface to system memory 712. System memory 712 may be used to load and store data and/or instructions, for example, for system 700. System memory 712 for one embodiment may include any suitable volatile memory, such as suitable dynamic random access memory (DRAM), for example.

NVM/storage 716 may include one or more tangible, non-transitory computer-readable media used to store data and/or instructions, for example, NVM/storage 716 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 716 may include a storage resource physically part of a device on which the system 700 is installed or it may be accessible by, but not necessarily a part of, the device. For example, the NVM/storage 716 may be accessed over a network via the network interface 720.

System memory 712 and NVM/storage 716 may respectively include, in particular, temporal and persistent copies of instructions 724. Instructions 724 may include instructions that when executed by at least one of the processor(s) 704 result in the system 700 implementing the method as described with reference to FIGS. 5 and/or 6. In various embodiments, instructions 724, or hardware, firmware, and/or software components thereof, may additionally/alternatively be located in the system control logic 708, the network interface 720, and/or the processor(s) 704.

In some embodiments in which the system 700 may implement eNB 101, network interface 720 may include control module 102, transceiver 103 and/or others as illustrated in FIG. 1, to provide a radio interface for system 700 to communicate over one or more network(s) and/or with any other suitable device. In some embodiments in which the system 700 may implement UE 201, network interface 720 may include transceiver 202, control module 203 and/or others as illustrated in FIG. 1, to provide a radio interface for system 700 to communicate over one or more network(s) and/or with any other suitable device. In various embodiments, the network interface 720 may be integrated with other components of system 700. For example, the network interface may include a processor of the processor(s) 704, memory of the system memory 712, NVM/Storage of NVM/Storage 716, and/or a firmware device (not being illustrated) having instructions that when executed by at least one of the processor(s) 704 result in the system 700 implementing the method as described with reference to FIG. 5 or FIG. 6.

Network interface 720 may further include any suitable hardware and/or firmware, such as a plurality of antennas (e.g., antenna 104 of eNB 101 or antenna 204 of UE 201) to provide a multiple input, multiple output radio interface. Network interface 720 for one embodiment may be, for example, a network adapter, a wireless network adapter, a telephone modem, and/or a wireless modem.

For one embodiment, at least one of the processor(s) 704 may be packaged together with logic for one or more controller(s) of system control logic 708. For one embodiment, at least one of the processor(s) 704 may be packaged together with logic for one or more controllers of system control logic 708 to form a System in Package (SiP). For one embodiment, at least one of the processor(s) 704 may be integrated on the same die with logic for one or more controller(s) of system control logic 708. For one embodiment, at least one of the processor(s) 704 may be integrated on the same die with logic for one or more controller(s) of system control logic 708 to form a System on Chip (SoC).

The system 700 may further include input/output (I/O) devices 732. The I/O devices 732 may include user interfaces designed to enable user interaction with the system 700, peripheral component interfaces designed to enable peripheral component interaction with the system 700, and/or sensors designed to determine environmental conditions and/or location information related to the system 700.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 720 to communicate with components of a positioning network, e.g., a global positioning system (GPS) satellite.

In various embodiments, the system 700 may be an eNB (e.g., eNB 101) and/or a UE (e.g., UE 201). In various embodiments, the system 700 may have more or less components, and/or different architectures.

Figure 8:
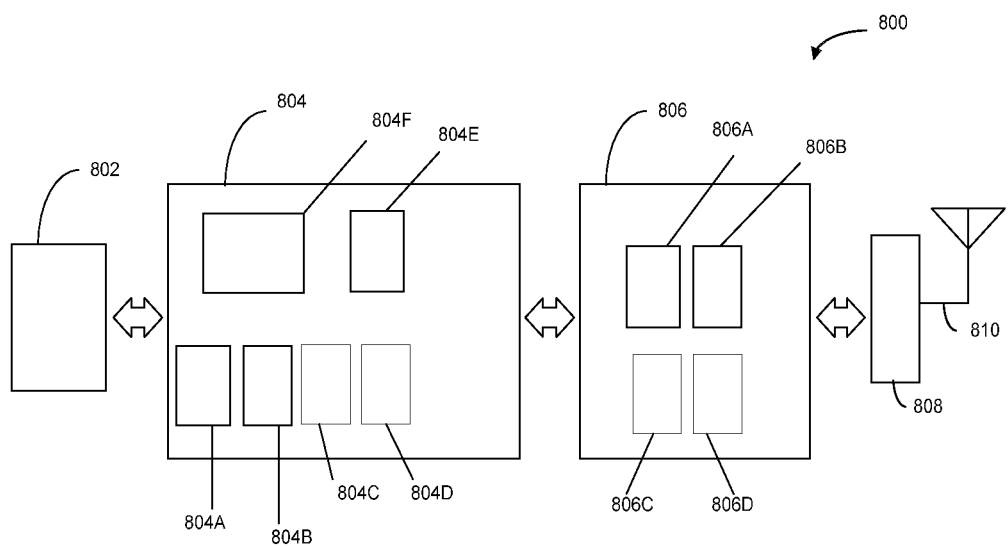
FIG. 8 schematically illustrates an example of the UE device, in accordance with various embodiments.

FIG. 8 illustrates, for one embodiment, example components of a UE device 800 in accordance with some embodiments. In some embodiments, the UE device 800 may include application circuitry 802, baseband circuitry 804. Radio Frequency (RF) circuitry 806, front-end module (FEM) circuitry 808, and one or more antennas 810, coupled together at least as shown. In some embodiments, the UE device 800 may include additional elements such as, for example, memory/storage, display, camera, sensor, and/or input/output (I/O) interface.

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a second generation (2G) baseband processor 804*a*, third generation (3G) baseband processor 804*b*, fourth generation (4G) baseband processor 804*c*, and/or other baseband processor(s) 804*d* for other existing generations, generations in development or to be developed in the future (e.g., fifth generation (5G), 6G, etc.). The baseband circuitry 804 (e.g., one or more of baseband processors 804*a*-*d*) may handle various radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, and/or constellation mapping/demapping functionality. In some embodiments, encoding/decoding circuitry of the baseband circuitry 804 may include convolution, tail-biting convolution, turbo. Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include elements of a protocol stack such as, for example, elements of an EUTRAN protocol including, for example, physical (PHY), media access control (MAC), radio link control (RLC), packet data convergence protocol (PDCP), and/or RRC elements. A central processing unit (CPU) 804*e* of the baseband circuitry 804 may be configured to run elements of the protocol stack for signaling of the PHY, MAC, RLC, PDCP and/or RRC layers. In some embodiments, the baseband circuitry may include one or more audio digital signal processor(s) (DSP) 804*f*. The audio DSP(s) 804*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806*a*, amplifier circuitry 806*b* and filter circuitry 806*c*. The transmit signal path of the RF circuitry 806 may include filter circuitry 806*c* and mixer circuitry 806*a*. RF circuitry 806 may also include synthesizer circuitry 806*d* for synthesizing a frequency for use by the mixer circuitry 806*a* of the receive signal path and the transmit signal path. In some embodiments, the mixer circuitry 806*a* of the receive signal path may be configured to down-convert RF signals received from the FEM circuitry 808 based on the synthesized frequency provided by synthesizer circuitry 806*d*. The amplifier circuitry 806*b* may be configured to amplify the down-converted signals and the filter circuitry 806*c* may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806*a* of the receive signal path may comprise passive mixers, although the scope of the embodiments is not limited in this respect.

In some embodiments, the mixer circuitry 806*a* of the transmit signal path may be configured to up-convert input baseband signals based on the synthesized frequency provided by the synthesizer circuitry 806*d* to generate RF output signals for the FEM circuitry 808. The baseband signals may be provided by the baseband circuitry 804 and may be filtered by filter circuitry 806*c*. The filter circuitry 806*c* may include a low-pass filter (LPF), although the scope of the embodiments is not limited in this respect.

In some embodiments, the mixer circuitry 806*a* of the receive signal path and the mixer circuitry 806*a* of the transmit signal path may include two or more mixers and may be arranged for quadrature downconversion and/or upconversion respectively. In some embodiments, the mixer circuitry 806*a* of the receive signal path and the mixer circuitry 806*a* of the transmit signal path may include two or more mixers and may be arranged for image rejection (e.g., Hartley image rejection). In some embodiments, the mixer circuitry 806*a* of the receive signal path and the mixer circuitry 806*a* may be arranged for direct downconversion and/or direct upconversion, respectively. In some embodiments, the mixer circuitry 806*a* of the receive signal path and the mixer circuitry 806*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806*d* may be a fractional-N synthesizer or a fractional N/N+1 synthesizer, although the scope of the embodiments is not limited in this respect as other types of frequency synthesizers may be suitable. For example, synthesizer circuitry 806*d* may be a delta-sigma synthesizer, a frequency multiplier, or a synthesizer comprising a phase-locked loop with a frequency divider.

The synthesizer circuitry 806*d* may be configured to synthesize an output frequency for use by the mixer circuitry 806*a* of the RF circuitry 806 based on a frequency input and a divider control input. In some embodiments, the synthesizer circuitry 806*d* may be a fractional N/N+1 synthesizer.

In some embodiments, frequency input may be provided by a voltage controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806*d* of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810.

In some embodiments, the UE 800 comprises a plurality of power saving mechanisms. If the UE 800 is in an RRC_Connected state, where it is still connected to the eNB as it expects to receive traffic shortly, then it may enter a state known as Discontinuous Reception Mode (DRX) after a period of inactivity. During this state, the device may power down for brief intervals of time and thus save power.

If there is no data traffic activity for an extended period of time, then the UE 800 may transition off to an RRC_Idle state, where it disconnects from the network and does not perform operations such as channel quality feedback, handover, etc. The UE 800 goes into a very low power state and it performs paging where again it periodically wakes up to listen to the network and then powers down again. The device cannot receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

The disclosure may include various example embodiments disclosed below.

Example 1 may include a user equipment (UE), comprising: a transceiver to receive a plurality of beam reference signals (BRSs) mapped on a plurality of transmission beams via at least one directional antenna panel; and a control module to generate a report to report receiving information associated with at least one of the BRSs on at least one of the transmission beams, wherein the report is further to comprise an antenna identifier to identify the directional antenna panel or an antenna port associated with the directional antenna panel which receives the at least one of the BRSs on the at least one of the transmission beam; wherein, the transceiver is further to transmit the report to a base station.

Example 2 may include the subject matter of Example 1, and optionally, wherein the antenna identifier is a 1 bit flag to indicate whether the direction antenna panel is a default antenna panel or whether the antenna port is a default antenna port.

Example 3 may include the subject matter of any of Examples 1-2, and optionally, wherein the report further comprises a BRS identifier to identify each of the at least one of the BRSs.

Example 4 may include the subject matter of any of Examples 1-3, and optionally, wherein the report further comprises a transmission beam identifier to identify each of the at least one of the transmission beams.

Example 5 may include the subject matter of any of Examples 1-4, and optionally, wherein the receiving information comprises receiving power or receiving quality of receiving the at least one of the BRSs on the at least one of the transmission beams.

Example 6 may include the subject matter of any of Examples 1-5, and optionally, wherein the receiving power is higher than a threshold.

Example 7 may include the subject matter of any of Examples 1-6, and optionally, wherein if the UE comprises more than one directional antenna panels, the receiving power in the report is the highest receiving power for each of the at least one of the BRSs on each of the at least one of the transmission beams across the directional antenna panels.

Example 8 may include the subject matter of any of Examples 1-7, and optionally, wherein the directional antenna panel comprises an antenna array of multiple antenna elements, which may point to a spatial direction based on at least one polarization direction through beamforming.

Example 9 may include the subject matter of any of Examples 1-8, and optionally, wherein the report further comprises a cell identifier to identify a serving cell that the at least one of the transmission beam is served.

Example 10 may include the subject matter of any of Examples 1-9, and optionally, wherein the base station is an evolved Node B.

Example 11 may include a base station, comprising: a transceiver to transmit, to a user equipment (UE), a plurality of beam reference signals (BRSs) via a plurality of transmission beams; and to receive, from the UE, a report to report receiving information associated with at least one of the BRSs on at least one of the transmission beams, wherein the report comprises an antenna identifier to identify a directional antenna panel or an antenna port associated with the directional antenna panel of the UE which receives the at least one of the BRSs on the at least one of the transmission beam.

Example 12 may include the subject matter of Example 11, and optionally, further comprising: a control module to utilize the report to configure channel control information; and wherein the transceiver is further to transmit the channel control information to the UE.

Example 13 may include the subject matter of any of Examples 11-12, and optionally, wherein that the control module utilizes the report further comprises to select one or more transmission beam candidates at least in part based on the receiving information in the report; and to configure the channel control information to include the antenna identifier of the directional antenna panel or the antenna port associated with the transmission beam candidates as least in part based on the report.

Example 14 may include the subject matter of any of Examples 11-13, and optionally, wherein that the control module utilizes the report further comprises to: select one or more transmission beam candidate at least in part based on the receiving information in the report; and determine one or more transmission antenna panels for transmission between the eNB and the UE at least in part based on a determination of whether the UE uses one or more directional antenna panel to receive the BRS on the transmission beam candidates.

Example 15 may include the subject matter of any of Examples 11-14, and optionally, wherein the channel control information is associated with a channel state information-reference signal (CSI-RS) and/or a second set of an enhanced physical control channel (EPDCCH).

Example 16 may include the subject matter of any of Examples 11-15, and optionally, wherein the antenna identifier is a 1 bit flag to indicate whether the direction antenna panel is a default antenna panel or whether the antenna port is the default antenna port.

Example 17 may include the subject matter of any of Examples 11-16, and optionally, wherein the report further comprises a BRS identifier to identify each of the at least one of the BRSs.

Example 18 may include the subject matter of any of Examples 11-17, and optionally, wherein the report further comprises a transmission beam identifier to identify each of the at least one of the transmission beams.

Example 19 may include the subject matter of any of Examples 11-18, and optionally, wherein the receiving information comprises receiving power or receiving quality of receiving the at least one of the BRSs on the at least one of the transmission beams.

Example 20 may include the subject matter of any of Examples 11-19, and optionally, wherein the receiving power is higher than a threshold.

Example 21 may include the subject matter of any of Examples 11-20, and optionally, wherein if the UE comprises more than one directional antenna panels, the receiving power in the report is the highest receiving power for each of the at least one of the BRSs on each of the at least one of the transmission beams across the directional antenna panels.

Example 22 may include the subject matter of any of Examples 11-21, and optionally, wherein the base station is an evolved Node B.

Example 23 may include a method, to be employed by a user equipment (UE), comprising: receiving a plurality of beam reference signals (BRSs) mapped on a plurality of transmission beams via at least one directional antenna panel; generating a report to report receiving information associated with at least one of the BRSs on at least one of the transmission beams, wherein the report is further to comprise an antenna identifier to identify the directional antenna panel or an antenna port associated with the directional antenna panel which receives the at least one of the BRSs on the at least one of the transmission beam; and transmitting the report to a base station.

Example 24 may include the subject matter of Example 23, and optionally, the antenna identifier is a 1 bit flag to indicate whether the direction antenna panel is a default antenna panel or whether the antenna port is a default antenna port.

Example 25 may include the subject matter of any of Examples 23-24, and optionally, wherein the report further comprises a BRS identifier to identify each of the at least one of the BRSs.

Example 26 may include the subject matter of any of Examples 23-25, and optionally, wherein the report further comprises a transmission beam identifier to identify each of the at least one of the transmission beams.

Example 27 may include the subject matter of any of Examples 23-26, and optionally, wherein the receiving information comprises receiving power or receiving quality of receiving the at least one of the BRSs on the at least one of the transmission beams.

Example 28 may include the subject matter of any of Examples 23-27, and optionally, wherein the receiving power is higher than a threshold.

Example 29 may include the subject matter of any of Examples 23-28, and optionally, wherein if the UE comprises more than one directional antenna panels, the receiving power in the report is the highest receiving power for each of the at least one of the BRSs on each of the at least one of the transmission beams across the directional antenna panels.

Example 30 may include the subject matter of any of Examples 23-29, and optionally, wherein the directional antenna panel comprises an antenna array of multiple antenna elements, which may point to a spatial direction based on at least one polarization direction through beamforming.

Example 31 may include the subject matter of any of Examples 23-30, and optionally, wherein the report further comprises a cell identifier to identify a serving cell that the at least one of the transmission beam is served.

Example 32 may include the subject matter of any of Examples 23-31, and optionally, wherein the base station is an evolved Node B.

Example 33 may include a method, to be employed by a base station, comprising: transmitting, to a user equipment (UE), a plurality of beam reference signals (BRSs) via a plurality of transmission beams; and receiving, from the UE, a report to report receiving information associated with at least one of the BRSs on at least one of the transmission beams, wherein the report comprises an antenna identifier to identify a directional antenna panel or an antenna port associated with the directional antenna panel of the UE which receives the at least one of the BRSs on the at least one of the transmission beam.

Example 34 may include the subject matter of Example 33, and optionally, further comprising: utilizing the report to configure channel control information; and transmitting the channel control information to the UE.

Example 35 may include the subject matter of any of Examples 33-34, and optionally, wherein the utilizing further comprises: selecting one or more transmission beam candidates at least in part based on the receiving information in the report; and configuring the channel control information to include the antenna identifier of the directional antenna panel or the antenna port associated with the transmission beam candidates as least in part based on the report.

Example 36 may include the subject matter of any of Examples 33-35, and optionally, wherein the channel control information is associated with a channel state information-reference signal (CSI-RS) and/or a second set of an enhanced physical control channel (EPDCCH).

Example 37 may include the subject matter of any of Examples 33-36, and optionally, wherein the utilizing further comprises: selecting one or more transmission beam candidate at least in part based on the receiving information in the report; and determining one or more transmission antenna panels for transmission between the eNB and the UE at least in part based on a determination of whether the UE uses one or more directional antenna panel to receive the BRS on the transmission beam candidates.

Example 38 may include the subject matter of any of Examples 33-37, and optionally, wherein the antenna identifier is a 1 bit flag to indicate whether the direction antenna panel is a default antenna panel or whether the antenna port is the default antenna port.

Example 39 may include the subject matter of any of Examples 33-38, and optionally, wherein the report is further to comprise a BRS identifier to identify each of the at least one of the BRSs.

Example 40 may include the subject matter of any of Examples 33-39, and optionally, wherein the report is further to comprise a transmission beam identifier to identify each of the at least one of the transmission beams.

Example 41 may include the subject matter of any of Examples 33-40, and optionally, wherein the receiving information comprises receiving power or receiving quality of receiving the at least one of the BRSs on the at least one of the transmission beams.

Example 42 may include the subject matter of any of Examples 33-41, and optionally, wherein the receiving power is higher than a threshold.

Example 43 may include the subject matter of any of Examples 33-42, and optionally, wherein if the UE comprises more than one directional antenna panels, the receiving power in the report is the highest receiving power for each of the at least one of the BRSs on each of the at least one of the transmission beams across the directional antenna panels.

Example 44 may include the subject matter of any of Examples 33-43, and optionally, wherein the base station is an evolved Node B.

Example 45 may comprise a computer-readable storage medium that stores instructions for execution by a processor to perform operations of a UE or a base station, the operations, when executed by the processor to execute any of the operations discussed above in any combination.

Example 46 may comprise an apparatus for a UE or a base station comprising means for executing any of the operations discussed above in any combination.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A user equipment (UE), comprising:
a transceiver to receive a plurality of beam reference signals (BRSs) mapped on a plurality of transmission beams via at least one directional antenna panel; and
control circuitry to generate a report to report receiving information associated with at least one of the BRSs on at least one of the plurality of transmission beams, wherein the report comprises an antenna identifier, wherein the antenna identifier is to identify a directional antenna panel of the at least one directional antenna panel or the antenna identifier is to identify an antenna port associated with the directional antenna panel which receives the at least one of the BRSs on the at least one of the plurality of transmission beams;
wherein the transceiver is further to transmit the report to a base station.

2. The UE of claim 1, wherein the antenna identifier is a 1 bit flag to indicate whether the directional antenna panel is a default antenna panel or whether the antenna port is a default antenna port.

3. The UE of claim 1, wherein the report further comprises a BRS identifier to identify each of the at least one of the BRSs.

4. The UE of claim 1, wherein the report further comprises a transmission beam identifier to identify each of the at least one of the transmission beams.

5. The UE of claim 1, wherein the receiving information comprises receiving power or receiving quality of receiving the at least one of the BRSs on the at least one of the transmission beams.

6. The UE of claim 5, wherein the receiving power is higher than a threshold.

7. The UE of claim 5, wherein if the UE comprises more than one directional antenna panel, the receiving power in the report is the highest receiving power for each of the at least one of the BRSs on each of the at least one of the transmission beams across the directional antenna panels.

8. The UE of claim 1, wherein the directional antenna panel comprises an antenna array of multiple antenna elements, which points to a spatial direction based on at least one polarization direction through beamforming.

9. The UE of claim 1, wherein the report further comprises a cell identifier to identify a serving cell that the at least one of the transmission beam is served.

10. An apparatus of a base station, comprising:
a transceiver to transmit, to a user equipment (UE), a plurality of beam reference signals (BRSs) via a plurality of transmission beams; and to receive, from the UE, a report to report receiving information associated with at least one of the BRSs on at least one of the plurality of transmission beams, wherein the report comprises an antenna identifier, wherein the antenna identifier is to identify a directional antenna panel or the antenna identifier is to identify an antenna port associated with the directional antenna panel of the UE which receives the at least one of the BRSs on the at least one of the plurality of transmission beams.

11. The apparatus of claim 10, further comprising:
control circuitry to utilize the report to configure channel control information; and wherein the transceiver is further to transmit the channel control information to the UE.

12. The apparatus of claim 10, wherein that the control circuitry utilizes the report further comprises to select one or more transmission beam candidates at least in part based on the receiving information in the report; and to configure channel control information to include the antenna identifier of the directional antenna panel or the antenna port associated with the transmission beam candidates at least in part based on the report.

13. The apparatus of claim 10, wherein that the control circuitry utilizes the report further comprises to:
select one or more transmission beam candidates at least in part based on the receiving information in the report; and
determine one or more transmission antenna panels for transmission between an eNB and the UE at least in part based on a determination of whether the UE uses one or more directional antenna panel to receive the BRS on the transmission beam candidates.

14. The apparatus of claim 10, wherein channel control information is associated with a channel state information-reference signal (CSI-RS) and/or an enhanced physical control channel (EPDCCH).

15. The apparatus of claim 10, wherein the antenna identifier is a 1 bit flag to indicate whether the directional antenna panel is a default antenna panel or whether the antenna port is a default antenna port.

16. The apparatus of claim 10, wherein the report further comprises a BRS identifier to identify each of the at least one of the BRSs.

17. The apparatus of claim 10, wherein the report further comprises a transmission beam identifier to identify each of the at least one of the transmission beams.

18. The apparatus of claim 10, wherein the receiving information comprises receiving power or receiving quality of receiving the at least one of the BRSs on the at least one of the transmission beams.

19. The apparatus of claim 18, wherein the receiving power is higher than a threshold.

20. The apparatus of claim 18, wherein if the UE comprises more than one directional antenna panel, the receiving power in the report is the highest receiving power for each of the at least one of the BRSs on each of the at least one of the transmission beams across the directional antenna panels.

21. An apparatus of a user equipment (UE), comprising:
memory having instructions;
processing circuitry coupled with the memory to execute the instructions to cause a control module to generate a report to report receiving information associated with at least one of a plurality of beam reference signals (BRSs) mapped on at least one of a plurality of transmission beams, wherein the plurality of BRSs are received from a base station via a directional antenna panel of the UE, and wherein the report comprises an antenna identifier, wherein the antenna identifier is to identify the directional antenna panel or the antenna identifier is to identify an antenna port associated with the directional antenna panel.

22. The apparatus of claim 21, further comprising:
a transceiver to receive the beam reference signals (BRSs) mapped on the transmission beams via the at least one directional antenna panel; and to transmit the report to the base station.

23. The apparatus of claim 21, wherein the antenna identifier is a 1 bit flag to indicate whether the directional antenna panel is a default antenna panel or whether the antenna port is a default antenna port.

24. The apparatus of claim 21, wherein the report further comprises a BRS identifier to identify each of the at least one of the BRSs.

25. The apparatus of claim 21, wherein the report further comprises a transmission beam identifier to identify each of the at least one of the transmission beams.

26. The apparatus of claim 21, wherein the receiving information comprises receiving power or receiving quality of receiving the at least one of the BRSs on the at least one of the transmission beams.

27. The apparatus of claim 26, wherein the receiving power is higher than a threshold.

28. The apparatus of claim 26, wherein if the UE comprises more than one directional antenna panel, the receiving power in the report is the highest receiving power for each of the at least one of the BRSs on each of the at least one of the transmission beams across the directional antenna panels.

29. The apparatus of claim 21, wherein the directional antenna panel comprises an antenna array of multiple antenna elements, which points to a spatial direction based on at least one polarization direction through beamforming.

30. The apparatus of claim 21, wherein the report further comprises a cell identifier to identify a serving cell that the at least one of the transmission beam is served.

* * * * *